United States Patent
Arraiz

(10) Patent No.: US 7,938,424 B2
(45) Date of Patent: May 10, 2011

(54) BICYCLE SUSPENSION

(76) Inventor: Luis Arraiz, Oxford (GB)

( * ) Notice: Subject to any disclaimer, the term of this patent is extended or adjusted under 35 U.S.C. 154(b) by 0 days.

(21) Appl. No.: 12/439,194

(22) PCT Filed: Aug. 21, 2007

(86) PCT No.: PCT/GB2007/003183
§ 371 (c)(1),
(2), (4) Date: Feb. 27, 2009

(87) PCT Pub. No.: WO2008/025950
PCT Pub. Date: Mar. 6, 2008

(65) Prior Publication Data
US 2009/0322055 A1    Dec. 31, 2009

(30) Foreign Application Priority Data
Aug. 30, 2006  (GB) .................................. 0617086.4

(51) Int. Cl.
*B62K 25/12* (2006.01)
(52) U.S. Cl. ........................................................ 280/284
(58) Field of Classification Search .................. 280/283, 280/284
See application file for complete search history.

(56) References Cited

U.S. PATENT DOCUMENTS

| 5,452,910 | A |  | 9/1995 | Harris |
| 6,135,903 | A | * | 10/2000 | Savard ............................ 474/80 |
| 6,283,487 | B1 |  | 9/2001 | Torre |
| 7,059,620 | B2 | * | 6/2006 | Chamberlain et al. ........ 280/284 |
| 7,210,695 | B2 |  | 5/2007 | Griffiths |
| 7,377,535 | B2 |  | 5/2008 | Chamberlain |
| 7,467,803 | B2 |  | 12/2008 | Buckley |
| 2002/0038944 | A1 |  | 4/2002 | Lawwill et al. |
| 2003/0038450 | A1 | * | 2/2003 | Lam ............................. 280/284 |
| 2003/0047905 | A1 |  | 3/2003 | Duval |
| 2005/0253357 | A1 |  | 11/2005 | Chang et al. |
| 2006/0033306 | A1 |  | 2/2006 | Sanchez |

FOREIGN PATENT DOCUMENTS

| DE | 19726067 A1 | 12/1998 |
| EP | 0645300 A1 | 3/1995 |
| EP | 1026073 A1 | 8/2000 |
| GB | 2419574 A | 5/2006 |
| WO | 9944880 A1 | 9/1999 |

\* cited by examiner

Primary Examiner — Tony H. Winner
(74) Attorney, Agent, or Firm — Vincent K. Gustafson; Hultquist IP

(57) ABSTRACT

A suspension system for a bicycle comprising a rear wheel mounting member (4), a chassis member (2), an upper linkage (6) pivotally connected to the rear wheel mounting member and the chassis member at first (P1) and second (P2) pivot points respectively and a lower linkage (8) pivotally connected to the rear wheel mounting member and the chassis member at third (P3) and fourth (P4) pivot points respectively thereby forming a four-bar linkage system, characterised in that the length of the upper linkage (6) between the first and second pivot point and the length of the lower linkage (8) between the third and fourth pivot points are both are greater than the separation between the second and fourth pivot points. An embodiment includes a jockey wheel or idler pulley which provides a tensioned portion of chain which passes through the instant centre of rotation (IC).

19 Claims, 5 Drawing Sheets

BICYCLE SUSPENSION

CROSS-REFERENCE TO RELATED APPLICATIONS

This is a U.S. national phase application under the provisions of 35 U.S.C. §371 of International Patent Application No. PCT/GB07/03183 filed on Aug. 21, 2007, which in turn claims priority of United Kingdom Patent Application No. 0617086.4 filed on Aug. 30, 2006. The disclosures of such international application and United Kingdom priority application are hereby incorporated herein by reference in their respective entireties, for all purposes.

TECHNICAL FIELD

This invention relates to a suspension system for a two wheeled vehicle, particularly but not exclusively an all-terrain bicycle.

BACKGROUND OF THE INVENTION

A rear suspension for a two wheel vehicle is utilized to isolate the operator, the rider, from the impacts and undulations of the terrain whilst maintaining rider control. There are various phenomena associated with the suspension of a two wheeled vehicle such as a bicycle; these tend to be a result of rider input or the movement of the rear wheel through its suspension travel. These are discussed briefly below.

Various proposals for bicycle rear suspension systems have been made, including various designs of four bar linkage type mechanism which typically comprises the frame (chassis), a rear triangle, and upper and lower links. An example of such a proposal is given in WO 2005/030564. Four bar linkages allow the rear wheel to move relative to the frame in a manner that will isolate the frame and rider from bumps and impacts. Shock absorption is usually provided by a spring, often with a damper to control the spring's oscillation. The spring is anchored to the frame and one of the linkages or rear triangle and acts upon it when the rear wheel moves.

A problem that the Applicant has recognized with four bar linkages is that of instant centre migration. The term instant centre, also known as the virtual pivot point, refers to the location of the centre point of the curvature of the wheel path at any point throughout the suspension movement. This point is found on a four bar linkage by extrapolating the straight line between the pivots on the upper and lower links. Where these two extrapolated lines cross is the instant centre. It can be seen that as the rear suspension moves and the position of the upper and lower links changes the position of the instant centre moves. The instant centre can migrate throughout the wheel travel and can cause unwanted handling phenomena such as an increase in chain length of the tensioned section of the chain, this leads to an effect known as pedal kickback where the alteration in distance between the front and rear sprockets forces one of the sprockets to rotate. On a bicycle the front sprocket tends to rotate causing the pedals to turn either backwards against the direction of power input, or to rapidly turn forwards due to a shortening of the chain length. This unbalances the rider. In a similar manner, pedal induced forces and braking forces can cause squat and jacking respectively. This is where the tension through the chain causes the wheel to rise relative to the chassis, this in turn leads to the effect of pedal-induced bob, and this means that rider energy is wasted as vertical movement rather than into forward motion. Braking forces induced from the contact patch can transmit forces through the suspension causing the wheel to be forced down relative to the frame. This is known as jacking.

On most bicycles, the rear wheel contact patch tends to move forwards as it rises throughout its suspension travel. The forward movement is usually in an almost opposing direction to the force being transmitted from a bump. When the contact patch hits a sharp rise in terrain, a force is transmitted through the wheel that will try to move the wheel upwards and slightly rearwards. If the wheel is restricted to travelling forwards causing a reduction in wheelbase as it rises, then it equates to a loss of energy over rough ground which may unsettle a rider by trying to pitch them forward. An alteration in wheelbase also changes the handling characteristics. A reduction in wheelbase usually leads to a less stable handling vehicle.

In the suspension system disclosed in the aforementioned WO 2005/030564, the design is intended to give an anti-squat curve in the initial part of the suspension travel, which decreases as the suspension moves deeper into its travel. The Applicant has determined that this arrangement gives uncontrolled movement of the rear axle path and indeed it is noted that at the far end of this travel the rear axle ends up forward of its initial position. This is undesirable, inter alia as it alters the chain length. The Applicant has also determined that the arrangement disclosed therein gives a large degree of instant centre migration, which is exacerbated by being relatively flat and horizontal. This is disadvantageous as set out above and contributes to a strong coupling between pedal forces and suspension movement.

BRIEF SUMMARY OF THE INVENTION

The present invention aims to improve on existing suspension systems and provides a suspension system for a bicycle comprising a rear wheel mounting member, a chassis member, an upper linkage pivotally connected to the rear wheel mounting member and the chassis member at first and second pivot points respectively and a lower linkage pivotally connected to the rear wheel mounting member and the chassis member at third and fourth pivot points respectively thereby forming a four-bar linkage system, characterised in that the length of the upper linkage between the first and second pivot point and the length of the lower linkage between the third and fourth pivot points are both are greater than the separation between the second and fourth pivot points.

Thus it will be seen by those skilled in the art that in accordance with the invention the linkages are relatively long and that they attach to the chassis relatively close together (compared to either of their lengths). This has been found to give several significant benefits as described below.

The primary advantage which the invention gives is that migration of the instant centre is significantly reduced as compared to that present in prior art arrangements, especially that shown in WO 2005/030564. This in turn gives a high degree of anti-squat which is maintained throughout the suspension travel.

A further advantage is that the rear axle follows a rearward and upward path which maintains a substantially constant wheelbase. This increases control as both the front and rear suspension cycle through their travel.

The Applicant has further appreciated that because there is minimal instant centre migration in accordance with the invention, this gives the opportunity of employing an idler or jockey wheel. Thus in preferred embodiments there is provided a jockey wheel mounted on the chassis to act on the chain. Preferably the jockey wheel is positioned such that it provides a tensioned portion of chain which passes through the instant centre line, that is the line described by the instant centre throughout the suspension travel. In other embodiments the jockey wheel is positioned so that the tensioned section of chain lies on a line that passes through the instant-centre. The tensioned section of chain, or the line on which it lies, preferably passes through the instant centre somewhere between a quarter and half-way through the suspension travel, preferably approximately a third of the way through the suspension travel. In some embodiments the chain or the line on which it lies passes through the instant centre at the mid-travel of the suspension.

Such a jockey wheel tends to separate the effect of pedalling on suspension movement which increases the efficiency of both functions. This means that the rearward contact patch movement can be maintained whilst almost eliminating suspension movements due to pedalling forces.

The top and bottom linkages may be of the same length as each other or may differ in length. In preferred embodiments of the invention the upper linkage is longer than the lower linkage. This has been found to maximize the benefits referred to above, particularly when a jockey wheel is employed.

Preferably the separation of the first and third pivot points on the rear wheel mounting member is greater than the lengths of both of the upper and lower linkages. Again here the length of a linkage is to be taken as the distance between its pivot points.

The linkages could be single pieces but in general will be composite. For example in preferred embodiments one or both of the linkages comprises a pair of parallel plates.

Preferably the suspension system is arranged such that the instant centre is located behind the front wheel axle and above the front sprocket throughout the range of suspension movement.

The rear wheel mounting member could take any form but preferably is generally triangular. This enhances its stiffness. The first and third pivot points are preferably approximately located at two forward vertices thereof, with the rear wheel mounted to the third, rearmost vertex.

BRIEF DESCRIPTION OF THE DRAWINGS

A preferred embodiment of the invention will now be described, by way of example only, with reference to the accompanying drawings in which.

DETAILED DESCRIPTION

Figure 1:
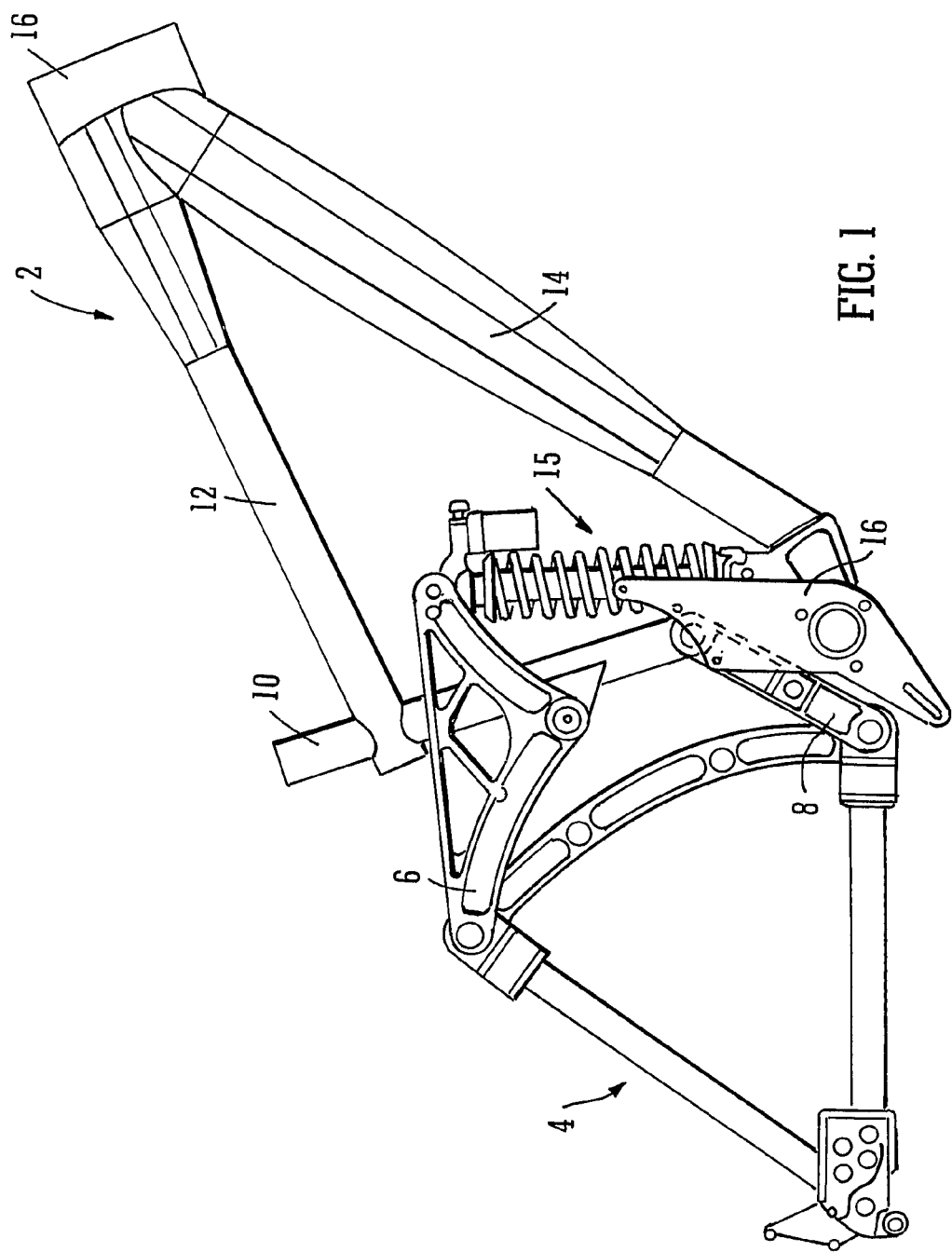
FIG. 1 shows an suspension system embodying of the invention.

FIG. 1 shows an embodiment of the invention. The suspension system depicted generally comprises a chassis member or frame 2, a rear wheel mounting member 4, an upper linkage 6 and a lower linkage 8. The chassis 2 is of relatively conventional construction with a seat support tube 10 (the seat being omitted for clarity) extending at a small rearward angle to the horizontal, a forward strut 12 extending at approximately right angles to the seat tube and a diagonal strut 14 joining the two to form a triangular shape. A tube 16 at the front receives the handlebar shaft. The pedals and pedal sprocket (not shown) are mounted on an axle extending through the base of the chassis in the conventional manner.

Figure 2:
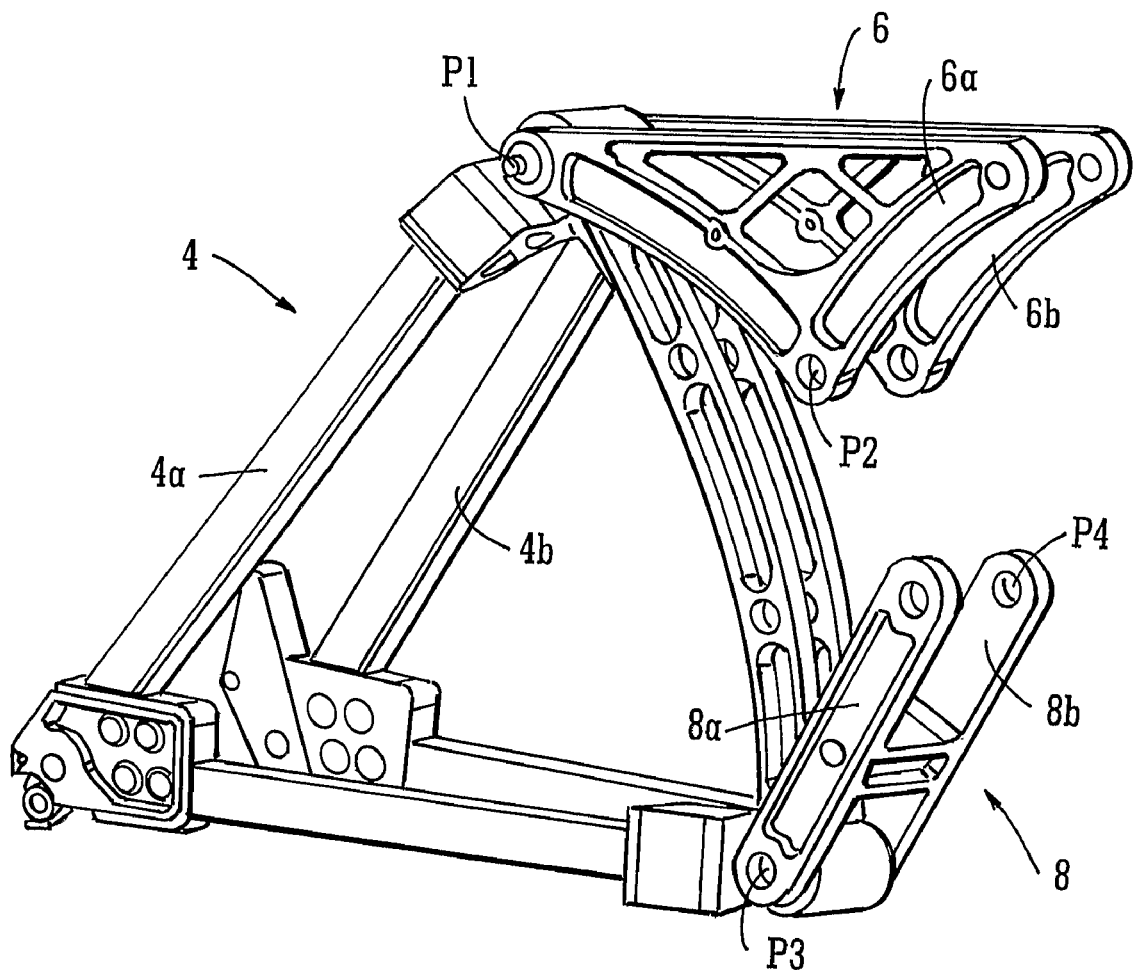
FIG. 2 shows a perspective view of part of the embodiment of FIG. 1.

The rear wheel mounting member and upper and lower linkages can be seen in more detail in FIG. 2. The rear wheel mounting member 4 comprises two almost identical, parallel, approximately triangular, frame-like portions 4a, 4b. The frame-like portions 4a, 4b are joined together at two vertex regions which define respective upper and lower pivot supports. These pivot supports support pivot axles P1, P3 of the upper and lower linkages 6, 8 respectively. At the rear regions, the two frame-like portions provide the mounting for the rear wheel (not shown) which is located between them.

The upper and lower linkages 6, 8 also comprise respective parallel plates 6a, 6b, 8a, 8b. The plates of the upper linkage 6a, 6b are joined by two pivot axles P1, P2. The plates of the lower linkage 8a, 8b are joined by two pivot axles P3, P4. As mentioned above pivots P1 and P3 couple the upper and lower linkages 6, 8 respectively to the rear wheel mounting member 4. The other pivots P2, P4 couple the linkages 6, 8 to the seat tube 10 of the chassis 2. A four bar linkage is thereby formed which allows the rear wheel to move relative to the main chassis 2 by compressing and extending the coil spring in the shock absorber 15.

The upper linkage 6 extends beyond the second pivot axle P2 to pivotally attach to the upper end of a shock absorber 15, the lower end of which is mounted to the lower part of the chassis 2 above the pedal (see FIG. 1). Finally in FIG. 1 a further plate 16 is mounted to rotate about the pedal axis and provides a mounting for the jockey wheel which is described below with reference to FIG. 7.

It may be seen from FIG. 1 that both the length of the upper linkage 4 between its pivot points P1, P2; and the length of the lower linkage 6 between its pivot points P3, P4 are greater than the separation between the pivot points P2, P4 at which the linkages are mounted the chassis 2. It will further be observed that the length of the upper linkage (P1 to P2) is greater than that of the lower linkage (P3 to P4). The advantages of these relative dimensions are described below.

Figure 3:
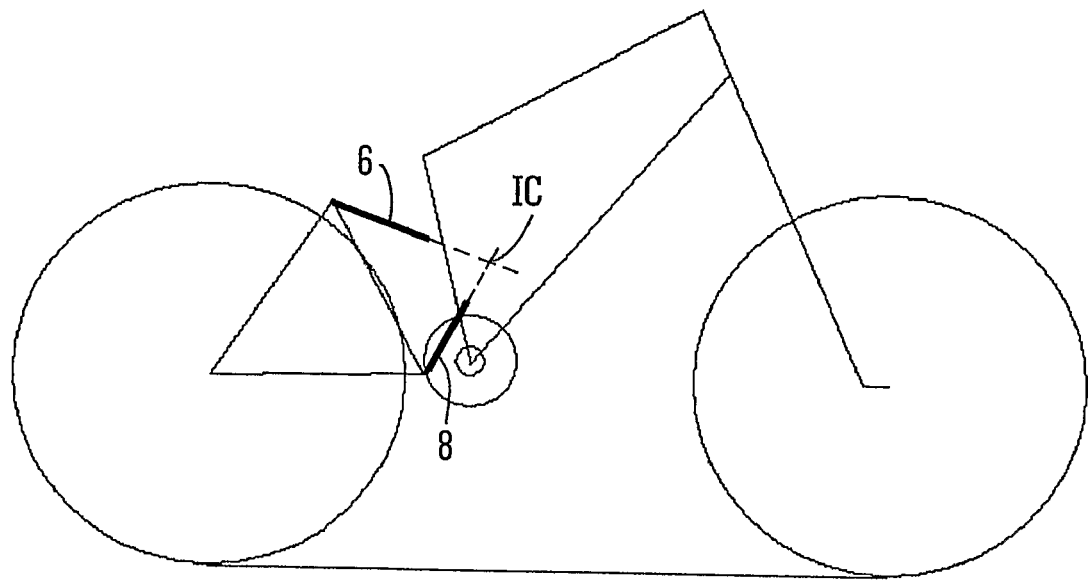
FIG. 3 is a schematic diagram of a bicycle embodying the invention which demonstrates the position of the instant centre.
Figure 4:
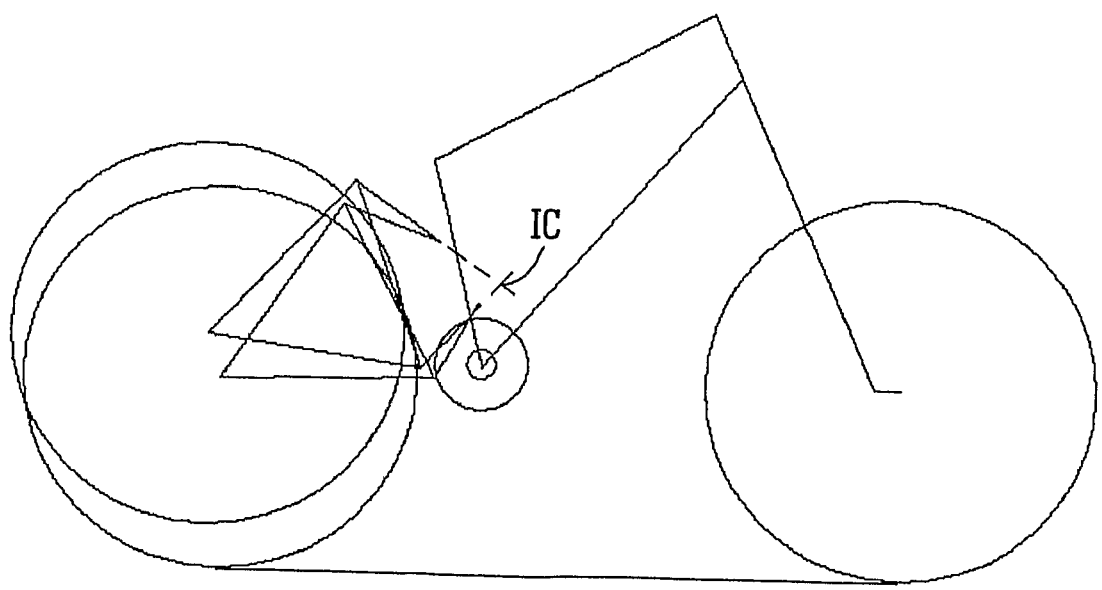
FIG. 4 is a schematic diagram showing how the instant centre moves when uneven ground is encountered.
Figure 5:
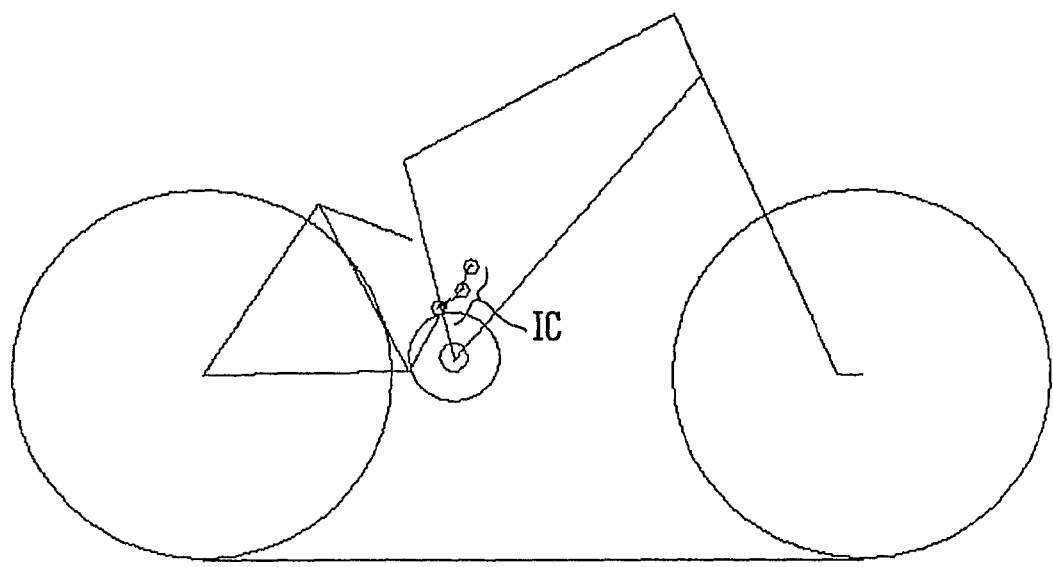
FIG. 5 shows the instant centre migration curve throughout the suspension travel.

FIG. 3 shows a simplified schematic diagram of the suspension arrangement described above. The axes of the two linkages 6, 8 are shown. The axis of a linkage member is defined as the line passing through its two pivot points. If these two axes are extrapolated the point at which they cross is known as the virtual pivot point or instant centre, IC. FIG. 3 shows the position of the IC when the cycle is on level ground and FIG. 4 shows the position of the IC when uneven ground is encountered and the suspension is mid-way through its travel. FIG. 5 shows the full instant centre migration curve throughout the whole of the suspension travel.

Figure 6:
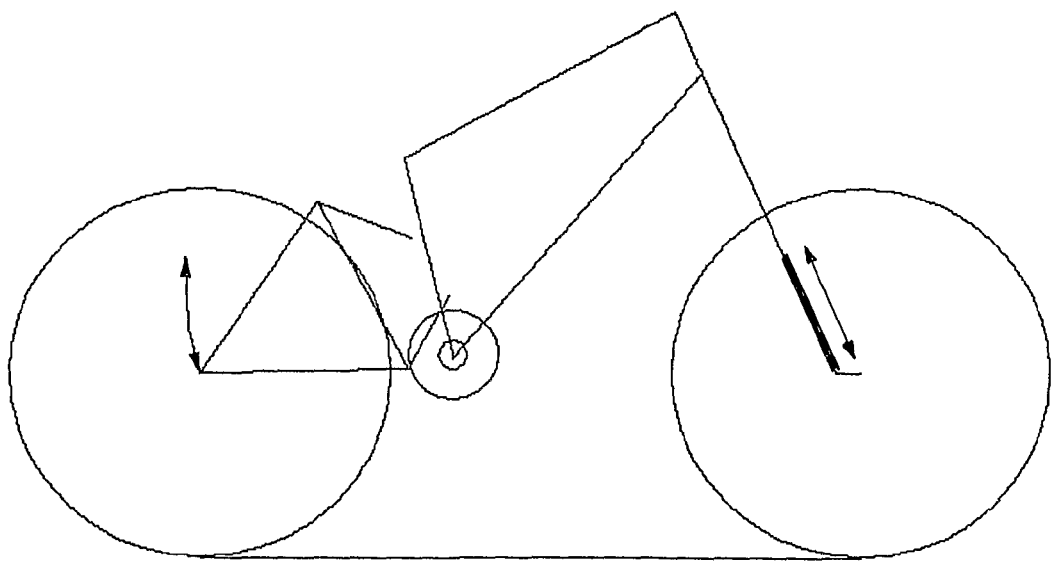
FIG. 6 is a schematic diagram showing the front and rear axle paths respectively.

The path of the front and rear wheel axles is shown by FIG. 6. It can be seen that the rear wheel moves along a similarly translated path to the front wheel. A near constant wheelbase is maintained and the wheel moves in a direction that is coherent to the forces transmitted through it by undulations in the terrain.

By positioning the static pivot points in the position illustrated by FIG. 1, the virtual pivot point can be located behind the front axle and above the front sprocket on the vehicle throughout the range of suspension movement as depicted by FIG. 5. This gives a near constant curve on a graph depicting braking force against suspension movement, otherwise known as anti-squat. The instant centre migration path is very small compared with many other four bar linkage layouts. The constant anti-squat curve allows the suspension to remain active when the suspension is subjected to braking forces. It is the relative positions of the pivot points within a certain area that controls the instant centre migration and the rear wheel path. Although certain other four bar linkage designs have attained a rearwards moving wheel path for the rear suspension, the Applicant is not aware of any others that attain both a rear moving wheel path and confine the instant centre migration curve to such a small area and desired location.

Figure 7:
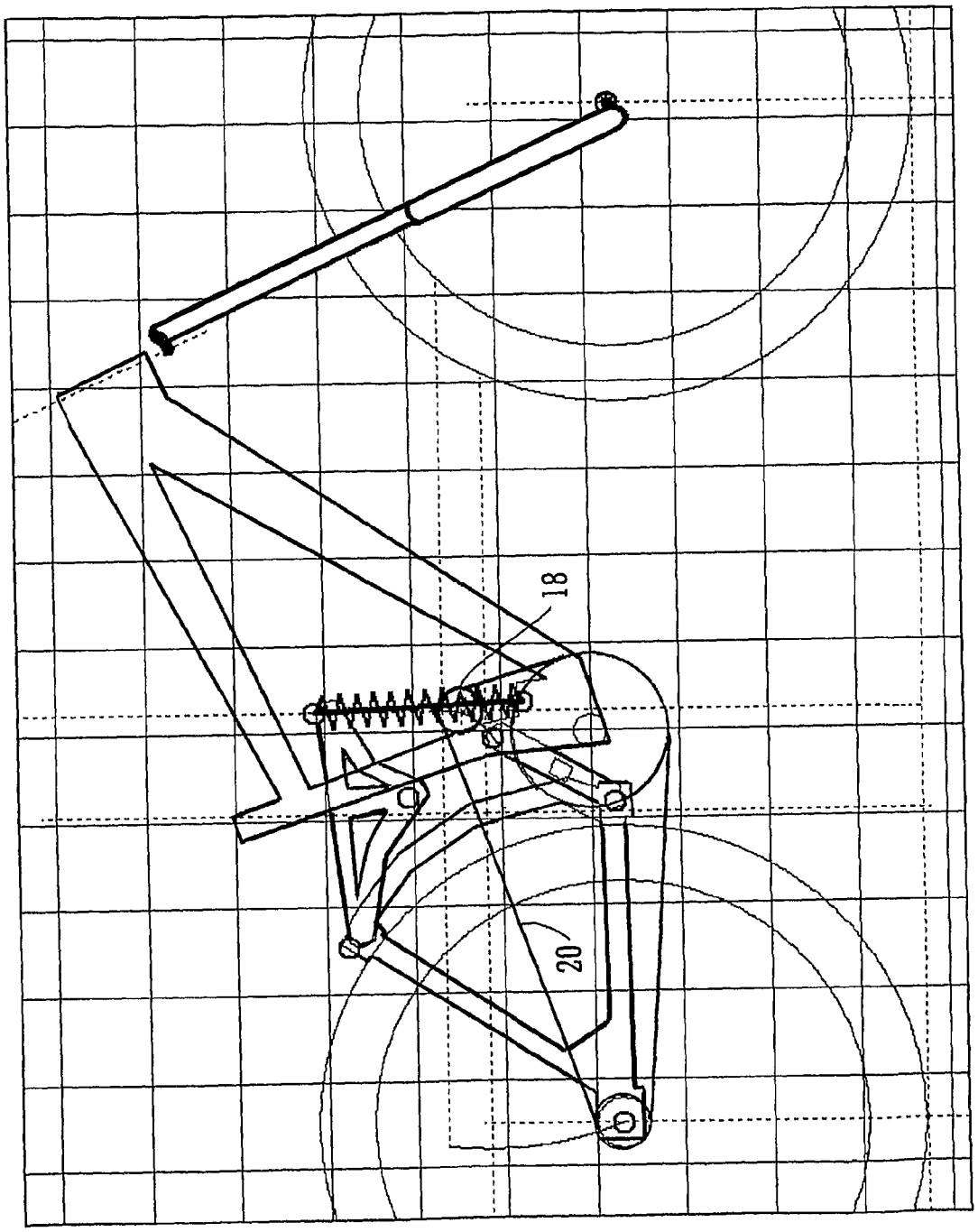
FIG. 7 is a view showing the jockey wheel and chain.

FIG. 7 shows schematically the positioning of a jockey wheel 18 mounted on the bracket 16 (FIG. 1) on the chain drive so that the tensioned section of the chain 20 lies on a line that passes through the instant centre at the mid-travel position. This creates the pedal efficiency by isolating the pedalling forces from the suspension movement. This means that the rearward contact patch movement can be maintained whilst almost eliminating suspension movements due to pedalling forces. The use of the jockey wheel creates minimal chain elongation with suspension movements reducing pedal kickback to just a few degrees of crank movement.

The main advantage of the embodiment of the invention described above is the ability to control the movement of the instant centre throughout the suspension travel to a minimal migration. When the jockey wheel is used too this means that there is a reduction in growth of the tensioned length of chain. This brings many desirable handling attributes that have been mentioned already. There is only a couple of degrees of pedal kickback, increased pedalling efficiency and active suspension under braking. The chain device positioned to carry the chain drive on a path directly to the instant centre further increases pedal efficiency.

Maintaining a constant wheel base allows the front and rear suspension to work in parallel as one cohesive unit rather than two separate entities, giving the vehicle a more stable and predictable handling characteristic.

It will be appreciated by those skilled in the art that the embodiment described is merely an example and many variations and modifications are possible without departing from the scope of the invention. For example whilst the jockey wheel is advantageous in at least some embodiments it is not essential and could be omitted. The precise form of the linkages and members shown is also not essential. For example the upper and lower linkages could be the same length or the upper could be longer than the lower.

The invention claimed is:

1. A suspension system for a bicycle comprising a rear wheel mounting member, a chassis member, a jockey wheel mounted on the chassis member and adapted to act on a chain of the bicycle, an upper linkage pivotally connected to the rear wheel mounting member and the chassis member at first and second pivot points respectively, and a lower linkage pivotally connected to the rear wheel mounting member and the chassis member at third and fourth pivot points respectively thereby forming a four-bar linkage system, wherein the length of the upper linkage between the first and second pivot points and the length of the lower linkage between the third and fourth pivot points are both greater than the separation between the second and fourth pivot points, and wherein the upper linkage is longer than the lower linkage.

2. A suspension system as claimed in claim 1 wherein the separation of the first and third pivot points on the rear wheel mounting member is greater than the lengths of both of the upper and lower linkages.

3. A suspension system as claimed in claim 1 wherein the separation of the first and third pivot points on the rear wheel mounting member is greater than the lengths of both of the upper and lower linkages and wherein the rear wheel mounting member is generally triangular.

4. A suspension system as claimed in claim 1 wherein the suspension system has an instant centre, and said jockey wheel is positioned such that the jockey wheel provides a tensioned portion of chain that passes through the instant centre.

5. A suspension system as claimed in claim 4 wherein said tensioned portion of chain passes through the instant centre when the suspension is between a quarter and half-way through its travel.

6. A suspension system as claimed in claim 4 wherein said tensioned portion of chain passes through the instant centre when the suspension is approximately a third of the way through its travel.

7. A suspension system as claimed in claim 4 wherein said tensioned portion of chain passes through the instant centre when the suspension is mid-way through its travel.

8. A suspension system as claimed in claim 1 wherein the suspension system has an instant centre, and said jockey wheel is positioned such that the jockey wheel provides a tensioned portion of chain which lies on a line that passes through the instant centre.

9. A suspension system as claimed in claim 8 wherein said line passes through the instant centre when the suspension is between a quarter and half-way through its travel.

10. A suspension system as claimed in claim 8 wherein said line passes through the instant centre when the suspension is approximately a third of the way through its travel.

11. A suspension system as claimed in claim 8 wherein said line passes through the instant centre when the suspension is mid-way through its travel.

12. A suspension system as claimed in claim 1 wherein one or both of said upper and lower linkages comprises a pair of parallel plates.

13. A suspension system as claimed in claim 1 wherein the rear wheel mounting member is generally triangular.

14. A suspension system as claimed in claim 13 wherein: the generally triangular rear wheel mounting member defines a first vertex, a second vertex, and a third vertex; the first and third pivot points are approximately located at the first vertex and second vertex, respectively; and said rear wheel mounting member is adapted to mount a rear bicycle wheel at the third vertex.

15. A bicycle including a suspension system as claimed in claim 1.

16. A suspension system as claimed in claim 1 wherein: the bicycle has a front wheel axle and a front sprocket, the suspension system has an instant centre and a range of suspension movement, and the instant centre is located behind the front wheel axle and above the front sprocket throughout the range of suspension movement.

17. A suspension system for a bicycle comprising a rear wheel mounting member, a chassis member, an upper linkage pivotally connected to the rear wheel mounting member and the chassis member at first and second pivot points respectively, and a lower linkage pivotally connected to the rear wheel mounting member and the chassis member at third and fourth pivot points respectively thereby forming a four-bar linkage system, wherein the length of the upper linkage between the first and second pivot points and the length of the lower linkage between the third and fourth pivot points are both greater than the separation between the second and fourth pivot points, the bicycle has a front wheel axle and a front sprocket, the suspension system has an instant centre and a range of suspension movement, and the instant centre is located behind the front wheel axle and above the front sprocket throughout the range of suspension movement.

18. A suspension system as claimed in claim 17, further comprising a jockey wheel mounted on the chassis member, wherein the jockey wheel is adapted to act on a chain of the bicycle.

19. A bicycle including a suspension system as claimed in claim 17.

* * * * *